July 3, 1956 J. JAMES 2,752,926
FALLING FRUIT RETARDER
Filed Dec. 5, 1952 2 Sheets-Sheet 2
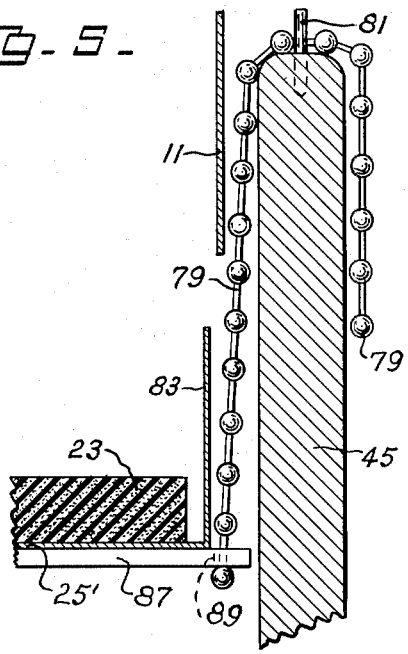
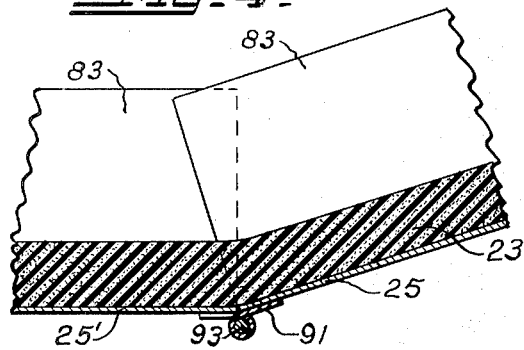
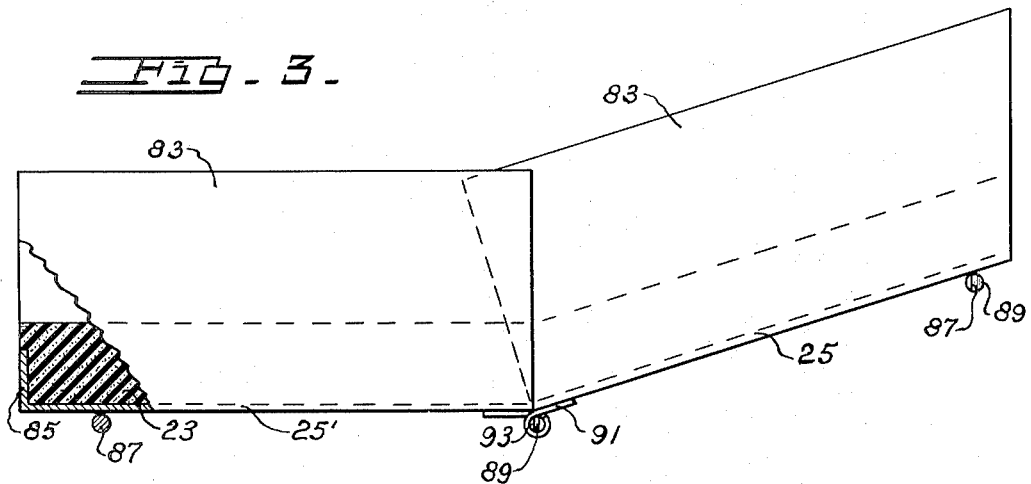
INVENTOR.
JOLLY JAMES
BY F. D. Hicks
His Attorney United States Patent Office 2,752,926
Patented July 3, 1956

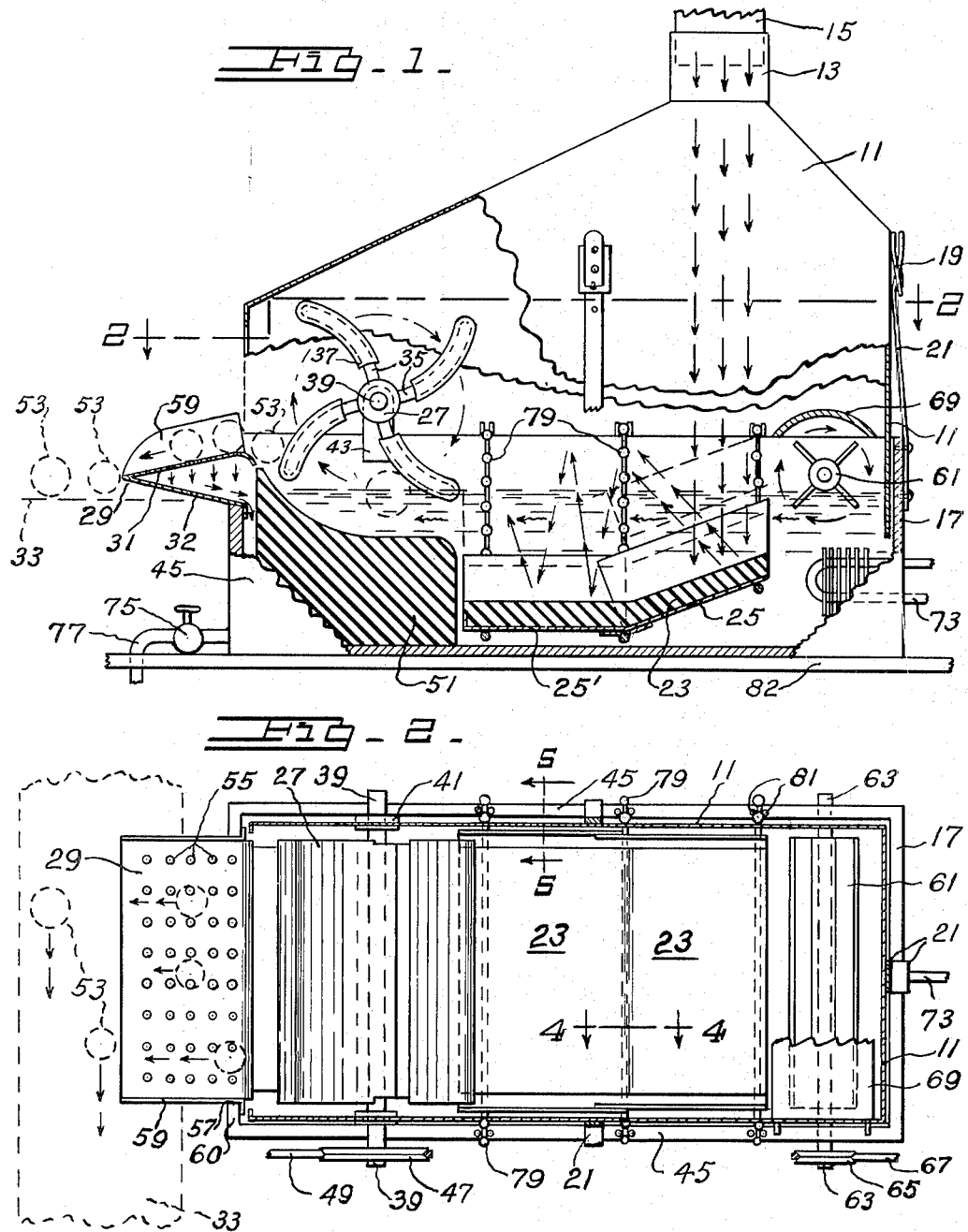

2,752,926
FALLING FRUIT RETARDER
Jolly James, Melvindale, Mich.

Application December 5, 1952, Serial No. 324,250

5 Claims. (Cl. 134—133)

The invention pertains to fruit picking and harvesting means and more particularly to a falling fruit retarder for gently cushioning the impact of the falling fruit so that it may be collected in good condition free from bruises and blemishes caused by the fruit collecting and handling apparatus.

In picking fruit by mechanical means, or by hand, it has been customary to elevate a flexible tube for receiving picked fruit into the upper end thereof in order that the fruit may be moved by gravity to the lower end of the tube to be delivered to a suitable location where it can be further processed or packed. Difficulty has been experienced in the utilization of such flexible fruit receiving tubes because the fruit tends to fall so rapidly and then to be stopped so suddenly at the bottom that the fruit is bruised. Where baffles are provided within the tube, there is the difficulty that the fruit is apt to become jammed or blocked within the tube due to the wide variety of different sizes of fruit which must be handled by such a tube.

It is accordingly an object of my invention to provide a falling fruit shock absorber for receiving falling fruit from the lower ends of such flexible tubes and for so gently cushioning the impact of such falling fruit that it is handled without causing bruises or blemishes thereon.

It is a further object of my invention to provide falling fruit retarding means which is so effective that all retarding means or obstructions may be eliminated from the flexible tube, and fruit of the ripest or softest grades may be safely handled and collected without causing any injury to the condition or grade of the fruit.

It is also an object of my invention to provide an effective falling fruit receiver and shock absorber of a simple construction, which can be utilized either for simple hand picking and packing or in combination with my fruit combine machine, disclosed in my co-pending patent application, subsequently listed.

Another object of my invention is to provide such a fruit receiver which may be utilized to receive and deliver the fruit either dry or wet.

A further object of my invention is to provide a fruit receiver which may also be utilized for chilling the fruit as it is received.

Further objects and advantages are within the scope of the invention, such as relate to the arrangement, operation and function of the related elements of the structure, to various details of construction and to combinations of parts, elements per se, and to economies of manufacture and numerous other features, as will be apparent from a consideration of the specification in conjunction with the drawings disclosing specific embodiments of the invention, wherein similar reference characters are applied to corresponding parts throughout, and in which:

Fig. 1 is a side elevational view partially broken away and sectioned to show the internal structure, and partially diagrammatic with dotted lines and arrows for illustrating the operation of the apparatus;

Fig. 2 is a section on line 2—2 in Fig. 1, and therefore shows a plan view of the interior of the apparatus;

Fig. 3 is an enlarged side elevational view of the cushion support, partially broken away and sectioned to show the internal structure thereof;

Fig. 4 is an enlarged fragmentary sectional view on line 4—4 of Fig. 2 for showing a detail of the cushion support; and Fig. 5 is an enlarged fragmentary sectional view on line 5—5 in Fig. 2, for showing how the cushion support is suspended from the tank wall.

Referring more specifically to Figs. 1 and 2 of the drawings, I have illustratively disclosed an embodiment of my falling fruit retarder comprising a hood 11 tapering down from an upwardly opening neck or duct 13 adapted to be attached in any suitable manner, as by cementing, stapling or riveting, to the lower end of a falling fruit delivery tube 15. The hood 11 may be made of suitable soft flexible sheet material such as rubber, sheet plastic, or some fabric such as canvas, for example. The upper portion of this hood is sustained by its suspension from the lower end of the falling fruit delivery tube 15 which is supported at its upper end by attachment to a picker carrying platform which supports the fruit picker as he picks fruit and drops it into the upper end of the tube, as disclosed in my co-pending patent application Serial No. 199,684, filed December 7, 1950, for example, or it may be attached to a ladder (not shown) which supports a fruit picker in a usual manner. The lower portion of the hood 11 is disposed inside of an enclosure 17 and the hood is secured snugly down thereto, as by buckles 19, or other attachment fixtures, in spaced relation thereon and receiving straps 21 secured at the lower ends to the outer walls of the enclosure.

Within the enclosure 17 a piece of flat cushion-like material 23, which may be sponge rubber, or plastic materials for example, is disposed at a position for receiving the fruit falling from the falling fruit delivery tube 15, as represented by the dotted lines and arrows. As shown, an inclined cushion support 25 is provided to support the flat cushion material 23 at an inclined position so that the fruit will bounce off at an angle thereby immediately removing it from the path of following fruit to avoid impact therewith, as represented by arrows. The cushion support 25 is preferably made as a two-part structure having a second or horizontal part 25' hinged to the first mentioned or inclined part so that a portion of the cushion-like material can be supported substantially horizontally at a position off-set from the path of the falling fruit, also represented by dotted lines and arrows, for receiving the bouncing fruit and causing it to bounce again to further absorb its kinetic energy, both from the vertical and the horizontal movements imparted thereto. In this manner the fruit is brought gently to rest in the proximity of the moving fruit delivery means 27 whereby the fruit is then gently engaged and delivered into a spout 29 having an upper wall 31 inclining outwardly so that the fruit rolls outwardly. From this spout the fruit drops gently upon the adjacent fruit processing means or transporting means 33, represented by dotted lines. This may be a fruit conveyor which will handle soft fruit without damage or injury to the quality or grade of the fruit, as in my aforementioned co-pending application.

The fruit delivery means 27 may consist of a rotary paddle wheel having its paddles 35 sheathed in a coating of soft material 37, such as rubber, for example. This paddle wheel may be carried upon a shaft 39 the ends of which are rotatively journalled in bearings 41 supported upon brackets 43 arising from the sidewalls 45 of the enclosure. Driving may be accomplished by means of a belt wheel 47 secured upon an exposed outer end of this shaft to receive a driving belt 49, which may be driven from the main central shaft of the fruit combine, shown in my co-pending patent application, although it may be driven by any suitable motive means, as will be readily understood. To facilitate leading the fruit gently from the enclosure up to the spout a large block 51 of soft sponge material, or rubber, is provided having an upper surface curving up to the spout with a radius slightly larger than the orbit of the paddle tips of the fruit delivery wheel and leading up to the spout from the end of the energy absorbing cushion. The fruit is represented by dotted circles 53. The cushion support is adapted to be elevated, as shown by dotted lines, to facilitate this movement of the fruit. This is done by structural details to be subsequently described.

The fruit delivery spout 29 is made of sheet metal bent to a substantially V-shaped cross-section, as may be seen in Fig. 1, to form the outward sloping upper wall 31 and also a bottom wall 32 which inclines back toward the tank to drain excess liquid back thereinto from the outgoing fruit, if the enclosure is charged with a liquid such as water or some solution. The upper and outwardly sloping wall 31 of the spout is provided with a great many small apertures 55 so that liquid draining from the fruit will drip down upon the lower wall 32 of the spout from which it drains back into the tank.

The ends of the spout are closed by end walls 59 secured snugly across and between said upper wall 31 and lower wall 32 as by being soldered thereto, and rising to provide upstanding side guides for the fruit as it rolls down the spout from the tank. The front wall 60 of the tank is cut down to provide a suitable notch 57 whereinto the spout structure is snugly fitted and secured in liquid tight sealing relation, as by soldering it thereinto. At the other or rear end of the tank, liquid circulating means 61 is provided, which may be a small paddle wheel, to cause the upper layer of the liquid to flow toward the front end where the spout is located so that the fruit is carried to within reach of the soft coated paddles of the fruit delivery wheel. The liquid circulating wheel 61 may be secured upon a shaft 63 having its ends extended for support in bearing apertures provided in the opposite sidewalls of the tank, as shown. On one outer extended end of this shaft a belt wheel 65 is secured for driving from a belt 67 which comes from the center shaft of my fruit combine, or by any other suitable motive means, so that this paddle wheel is turned clockwise, as seen in Fig. 1.

This liquid circulator 61 causes the upper layer of the liquid in the tank to flow and carry the floating fruit toward the fruit delivery means or large paddle wheel, as represented by arrows and dotted circles, to be delivered up into the spout. A cover 69 may be provided over the paddle wheel and supported between the adjacent sidewalls 45 for covering the small paddle wheel to contain splash and return it into the tank. A loop of finned tube 73 may be inserted into the liquid containing space of the tank through the rearwall 71 thereof. Connection of the conduit of the finned heat exchanger structure with a suitable refrigerant compressor unit or a source of cold brine (not shown) serves to cool the liquid in the tank. Thus the liquid may be utilized to also chill the fruit and make it firm to sustain other processing to which it is to be subjected as it is being prepared for packing.

The lower edges of the hood 11 are tucked inside of the tank to return the splash thereinto. As fruit falls into the liquid containing tank the liquid also serves as a very effective shock absorber and also it damps out the bouncing movements of the fruit, bringing it more quickly to rest. A valve 75 in a drain tube 77 leads from the bottom of the tank for conveniently draining the liquid for dry operation, as desired.

The hinged cushion support is suspended between the sidewalls 45 of the tank by ball chains 79 which pass up and outwardly over the sides of the tank to be caught between pairs of spaced pins 81 in the upper edge of the sidewalls. The cushion 23 is thereby conveniently adjusted and supported at any desired level of elevation in the tank and the inclined portion of the cushion is adjusted to any desired angle of inclination by merely grasping outward hanging ends of these chains, lifting the chains from the pairs of pins and reinserting the chains between the pins at the desired level. The falling fruit retarder may be installed upon any suitable platform or support 82.

Enlarged side view Fig. 3, and enlarged fragmentary views shown in Figs. 4 and 5, more clearly show the structure of the hinged cushion support, which may be simply made of sheet metal of suitable weight. As shown, each part of this cushion support is provided with upturned sidewalls 83 and the upturned sidewalls of the upper or inclined part being narrower to fold or telescope into the sidewalls of the lower part for free adjustment of the inclined part relative to the horizontal part. The front end of the lower or horizontal part 25' of the cushion support has an upturned front flange 85 which holds the piece of flat cushion-like sponge material from sliding down out of the holder. The front end of the horizontal part and the rear end of the inclined part of this cushion holder are each provided with a support rod 87 transversely thereunder and extended to project sufficiently at the opposite ends for attachment to the supporting chains. The chains may be attached in any convenient manner, as by providing the ends of these rods with slots 89 which snugly receive the links of the chain, as seen in Fig. 5. The adjacent ends of the two parts of this cushion support are pivotally joined by an elongated or piano type hinge 91, the hinge pin 93 of which extends to provide projecting ends slotted to receive chains therein and this pin serves also as a cross-rod for supporting the mid-portion of the hinged structure.

It is apparent that within the scope of the invention modifications and different arrangements may be made other than herein disclosed, and the present disclosure is illustrative merely, the invention comprehending variations thereof.

What I claim as may invention and desire to secure by Letters Patent of the United States is:

1. A falling fruit receiver and retarder of the type described comprising an open top tank for supporting a quantity of liquid to receive and retard falling pieces of fruit, resilient cushioning means also disposed and immersed in the liquid in said tank in the path of fall of said pieces of fruit, a hood of flexible material fitting over the open top of the tank with the lower portions of the hood being disposed within the tank so as to recover and return splashed liquid into the tank, the upper portion of said hood also being attachable to the lower end of a falling fruit conducting tube, fruit delivery means for delivering received and retarded pieces of fruit from said tank, said fruit delivery means including a spout mounted outside of said tank slightly above the desired liquid level with said spout having an upper perforated surface inclined downwardly from said tank for delivering fruit out of the tank by gravity and a lower imperforate surface located directly below said upper surface and inclined downwardly toward the tank for collecting and returning the liquid back into the tank as it is shed from the delivered pieces of fruit, and elevating means for raising the fruit from said cushioning means to said spout.

2. The combination as set forth in claim 1, wherein the portion of said cushioning means which is in the direct path of fall of said pieces of fruit is at an inclined angle to the said path of fall.

3. A falling fruit receiver and retarder of the type described comprising an open top tank for supporting a quantity of liquid to receive and retard falling fruit, a fruit delivery spout leading from the tank at a level slightly higher than the desired level of liquid to be carried in said tank, a rotary fruit delivery member of a conformation resembling a paddle wheel, means mounting said fruit delivery member rotatively adjacent said spout for raising fruit thereto by rotating the under portion toward the spout, fruit leading means providing a smoothly curved surface under said rotary fruit delivery member for leading fruit smoothly up to said spout as said fruit delivery member is rotated with the under portion thereof moving toward the spout, said spout comprising an upper perforated surface inclined downwardly away from the tank to lead fruit therefrom by gravity while draining liquid shed from the fruit, and a lower imperforate surface located directly below said upper surface and inclined downwardly toward the tank to return shed liquid back to the tank.

4. The combination as set forth in claim 3, including resilient cushioning means disposed in said tank and in a position to receive pieces of fruit discharged into the tank.

5. The combination as set forth in claim 4, wherein a portion of said resilient cushioning means is also disposed at an angle to the normal fall path of pieces of fruit into the fruit retarder and receiver.

References Cited in the file of this patent

UNITED STATES PATENTS

| | | |
|---|---|---|
| 190,559 | Curtis | May 8, 1877 |
| 202,042 | Miller | Apr. 2, 1878 |
| 444,884 | Howell | Jan. 20, 1891 |
| 721,013 | Butler | Feb. 17, 1903 |
| 790,580 | Kurtz | May 23, 1905 |
| 1,285,560 | Chase | Nov. 19, 1918 |
| 1,390,268 | Beckett | Sept. 13, 1921 |
| 1,883,800 | Krider | Oct. 18, 1932 |
| 2,090,258 | Hunter | Aug. 17, 1937 |
| 2,494,864 | Erickson | Jan. 17, 1950 |
| 2,618,577 | Bash | Nov. 18, 1952 |
| 2,644,569 | Francisco | July 7, 1953 |
| 2,650,464 | Bernheim | Sept. 1, 1953 |
| 2,684,155 | Hartrampf | July 20, 1954 |